(12) United States Patent
Uyeno et al.

(10) Patent No.: US 11,901,646 B2
(45) Date of Patent: *Feb. 13, 2024

(54) SENSOR FOR DEGRADED VISUAL ENVIRONMENT

(71) Applicant: RAYTHEON COMPANY, Waltham, MA (US)

(72) Inventors: Gerald P. Uyeno, Tucson, AZ (US); Sean D. Keller, Tucson, AZ (US); Benn Gleason, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/940,910

(22) Filed: Sep. 8, 2022

(65) Prior Publication Data

US 2023/0006348 A1 Jan. 5, 2023

Related U.S. Application Data

(63) Continuation of application No. 16/396,574, filed on Apr. 26, 2019, now Pat. No. 11,495,883.

(51) Int. Cl.
*H01Q 3/26* (2006.01)
*H04B 10/40* (2013.01)
*G02B 27/10* (2006.01)
*G01S 7/4915* (2020.01)

(52) U.S. Cl.
CPC ......... *H01Q 3/2676* (2013.01); *G01S 7/4915* (2013.01); *G02B 27/1006* (2013.01); *H04B 10/40* (2013.01); *H04B 2210/006* (2013.01)

(58) Field of Classification Search
CPC .......... H04B 7/0817; H04B 10/40; H04B 2210/006; G01S 17/89; G02B 27/1006; H01Q 21/0025; H01Q 3/2676
See application file for complete search history.

(56) References Cited

U.S. PATENT DOCUMENTS 10,094,855 B1* 10/2018 Fuhr ................. G01S 3/02
2017/0187721 A1* 6/2017 Raynor ............ H01L 31/107

OTHER PUBLICATIONS

Christopher Schuetz, "A Promising Outlook for Imaging Radar", May 2018, IEEE Microwave magazine, All Pages (Year: 2018).*
U.S. Office Action from U.S. Appl. No. 16/276,537, dated Apr. 16, 2021, 15 pages.

(Continued)

*Primary Examiner* — Pranesh K Barua
(74) *Attorney, Agent, or Firm* — LEWIS ROCA ROTHGERBER CHRISTIE LLP

(57) ABSTRACT

A sensing system. In some embodiments, the system includes a first imaging radio frequency receiver, a second imaging radio frequency receiver, a first optical beam combiner, a first imaging optical receiver, a second optical beam combiner, and an optical detector array. The first optical beam combiner may be configured to combine optical signals of the imaging radio frequency receivers. The second optical beam combiner may be configured to combine the optical signals of the imaging radio frequency receivers, and the optical signal of the first imaging optical receiver.

5 Claims, 6 Drawing Sheets

(56) References Cited

OTHER PUBLICATIONS

Deroba, Joseph C. et al., "Smart Antenna Using Element-level Photonic Up-conversion to Generate an Apodized Beam-space for Increased Spatial Isolation", IEEE Antennas and Wireless Propagation Letters, 2017, pp. 1-4.

Macario, Julien et al., "Full spectrum millimeter-wave modulation", Optics Express, Oct. 8, 2012, pp. 23623-23629, vol. 20, No. 21, Optical Society of America.

Murakowski, Janusz et al., "Photonic probing of radio waves for k-space tomography", Optics Express, Jul. 10, J017, pp. 15746-15759, vol. 25, No. 14, Optical Society of America.

Prather, Dennis W., "5G Moves into the light: Holographic massive MIMO", IEEE Communications Society Technology News, Jun. 2016, pp. 1-5, IEEE Communications Society.

Prather, Dennis W. et al., "Optically-Upconverted, Spatially-Coherent Phased Array Antenna Feed Networks for Beam-Space MIMO in 5G Cellular Communications", Dec. 2017, pp. 1-11.

Schneider, Garrett J. et al., "Radiofrequency signal-generation system with over seven octaves of continuous Tuning", Nature Photonics Letters, Jan. 20, 2013, pp. 1-5, Letters, Macmillan Publishers Limited.

Schuetz, Christopher A. et al., "A Promising Outlook for Imaging Radar", IEEE Microwave Magazine, May 2018, pp. 91-101, IEEE.

Schuetz, Christopher A. et al., "Imaging Flash-RADAR Realized using Photonic Spatial Beam Processing", 2018, 17 pages.

Shi, Shouyuan et al., "Conformal Wideband Optically Addressed Transmitting Phased Array With Photonic Receiver", Journal of Lightwave Technology, Oct. 15, 2014, pp. 3468-3477, vol. 32, No. 20, IEEE.

Shi, Shouyuan et al., "Ultrawideband Optically Fed Tightly Coupled Phased Array", Journal of Lightwave Technology, Dec. 1, 2015, pp. 4781-4790, vol. 33, No. 23, IEEE.

U.S. Appl. No. 16/276,537, filed Feb. 14, 2019.

Wang, Fuquan et al., "Photonic Generation of High Fidelity RF Sources for Mobile Communications", Journal of Lightwave Technology, 2016, pp. 1-7, IEEE.

* cited by examiner

SENSOR FOR DEGRADED VISUAL ENVIRONMENT

CROSS-REFERENCE TO RELATED APPLICATIONS

This patent application is a continuation application of U.S. patent application Ser. No. 16/396,574, filed Apr. 26, 2019 and entitled "SENSOR FOR DEGRADED VISUAL ENVIRONMENT," the contents of all of which are incorporated by reference in their entirety herein.

FIELD

One or more aspects of embodiments according to the present invention relate to sensing, and more particularly to a sensing system capable of sensing in a degraded visual environment.

BACKGROUND

Imaging and ranging sensors in commercial and military operations have a wide range of applications, and may be affected differently by different circumstances. For example, optical sensors that operate in the visible or short-wavelength infrared parts of the spectrum may have relatively good resolution, but their performance may be readily degraded by the presence of dust or fog. The performance of radio frequency and long-wavelength infrared sensors may be less easily degraded, but their resolution may be inferior. Conditions in which such sensors are used may change rapidly; for example, a helicopter near the ground may raise, as a result of draft from its main rotor, a cloud of dust that may obscure the view of the pilot and also of any optical electronic sensors operating in the visible part of the spectrum.

Thus, there is a need for a versatile sensor capable of operating in a degraded visual environment.

SUMMARY

According to an embodiment of the present invention, there is provided a sensing system, including: a first imaging radio frequency receiver, a second imaging radio frequency receiver, a first optical beam combiner a first imaging optical receiver, a second optical beam combiner, an optical detector array, a read out integrated circuit, and a processing circuit, the first optical beam combiner being configured to combine: an optical signal of the first imaging radio frequency receiver, and an optical signal of the second imaging radio frequency receiver, the second optical beam combiner being configured to combine: the optical signal of the first imaging radio frequency receiver, the optical signal of the second imaging radio frequency receiver, and an optical signal of the first imaging optical receiver, the first imaging radio frequency receiver being configured to form, on the optical detector array, an optical image of a radio frequency scene within a field of view of the first imaging radio frequency receiver, the second imaging radio frequency receiver being configured to form, on the optical detector array, an optical image of an optical scene within a field of view of the second imaging radio frequency receiver, and the first imaging optical receiver being configured to form, on the optical detector array, an optical image of an optical scene within a field of view of the first imaging optical receiver.

In some embodiments, the sensing system further includes a radio frequency transmitter, configured to illuminate a radio frequency scene within the field of view of the second imaging radio frequency receiver.

In some embodiments, the sensing system further includes a ranging circuit for measuring a first time of flight, between a radio frequency pulse emitted by the radio frequency transmitter and a signal, from the optical detector array, corresponding to a reflection from the radio frequency scene of the radio frequency pulse.

In some embodiments, the sensing system further includes: a second imaging optical receiver, a third optical beam combiner, and an optical transmitter, configured to illuminate an optical scene within the field of view of the second imaging optical receiver, the third optical beam combiner being configured to combine: the optical signal of the first imaging radio frequency receiver, the optical signal of the second imaging radio frequency receiver, the optical signal of the first imaging optical receiver, and an optical signal of the second imaging optical receiver, the second imaging optical receiver being configured to form, on the optical detector array, an optical image of an optical scene within a field of view of the second imaging optical receiver.

In some embodiments, the optical detector array is configured to operate at any time in one of: a first mode, in which the optical detector array detects optical signals in a first wavelength range, the first wavelength range being entirely within the wavelength range from 1.2 microns to 3 microns, and a second mode, in which the optical detector array detects optical signals in a second wavelength range, the second wavelength range being entirely within the wavelength range from 0.2 microns to 15 microns.

In some embodiments: the imaging radio frequency receivers have output wavelengths entirely contained within the first wavelength range; the second optical beam combiner is configured: to transmit the optical signals of the imaging radio frequency receivers, and to reflect the optical signal of the first imaging optical receiver; the first imaging optical receiver is configured to transmit light within the second wavelength range; and the second optical beam combiner has a wavelength-dependent transmissivity, the transmissivity being: greater than 60% for a first wavelength, within the first wavelength range, and less than 40% for a second wavelength, within the second wavelength range.

In some embodiments: the third optical beam combiner is configured: to transmit: the optical signals of the imaging radio frequency receivers, and the optical signal of the first imaging optical receiver, and to reflect the optical signal of the second imaging optical receiver; and the second imaging optical receiver is configured to transmit light within the first wavelength range.

In some embodiments, the sensing system further includes a ranging circuit for measuring a second time of flight, between an optical pulse emitted by the optical transmitter and a signal, from the optical detector array, corresponding to a reflection from the optical scene of the optical pulse.

In some embodiments, the sensing system further includes including an image separation circuit configured to generate, from a signal from the optical detector array, a first image, corresponding to the reflection, from the radio frequency scene, of the radio frequency pulse, and a second image, corresponding to the reflection, from the optical scene, of the optical pulse.

In some embodiments, the image separation circuit is further configured: to generate, from the signal from the optical detector array, a third image, corresponding to optical emission from the optical scene to generate, from the signal from the optical detector array, a fourth image, corresponding to radio frequency emission from the radio frequency scene.

In some embodiments: the optical detector array is configured to operate at any time in one of: a first mode, in which the optical detector array detects optical signals in a first wavelength range, the first wavelength range being entirely within the wavelength range from 1.2 microns to 3 microns, and a second mode, in which the optical detector array detects optical signals in a second wavelength range, the second wavelength range being entirely within the wavelength range from 0.2 microns to 15 microns; and the sensing system is configured to operate: with the optical detector array in the first mode during a first time interval, and with the optical detector array in the second mode during a second time interval; and the image separation circuit is configured to generate the third image from a first portion of the signal from the optical detector array, the first portion corresponding to the second time interval.

In some embodiments, the image separation circuit is configured to generate the first image from a second portion of the signal from the optical detector array, the second portion corresponding to a sub-interval of the first time interval in which the reflection, from the optical scene, of the optical pulse, is absent.

In some embodiments, the image separation circuit is configured to generate the second image from a third portion of the signal from the optical detector array, the third portion corresponding to a sub-interval of the first time interval in which the reflection, from the radio frequency scene, of the radio frequency pulse, is absent.

In some embodiments, the sensing system further includes a display connected to the processing circuit.

In some embodiments, the processing circuit is configured to: receive user input to select from among the first image, the second image, the third image and the fourth image, and to cause the display to display the selected image.

In some embodiments, the processing circuit is configured to display two of: the first image, the second image, the third image, and the fourth image, concurrently.

In some embodiments, the processing circuit is configured to display: a portion of one of: the first image, the second image, and the third image, and the fourth image, a portion of another one of: the first image, the second image, and the third image, and the fourth image, concurrently.

In some embodiments, the processing circuit is configured to display: a portion of the first image, a portion of the second image, and a portion of the third image, and the fourth image, concurrently.

In some embodiments, the processing circuit is configured to display a portion of the first image, and, overlaid on the portion of the first image, text indicating a range corresponding to the first time of flight.

In some embodiments, the processing circuit is configured to display a portion of the third image, and, overlaid on the portion of the first image, text indicating a range corresponding to the second time of flight.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a sensor for a degraded visual environment provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the scope of the invention. As denoted elsewhere herein, like element numbers are intended to indicate like elements or features.

Figure 1:
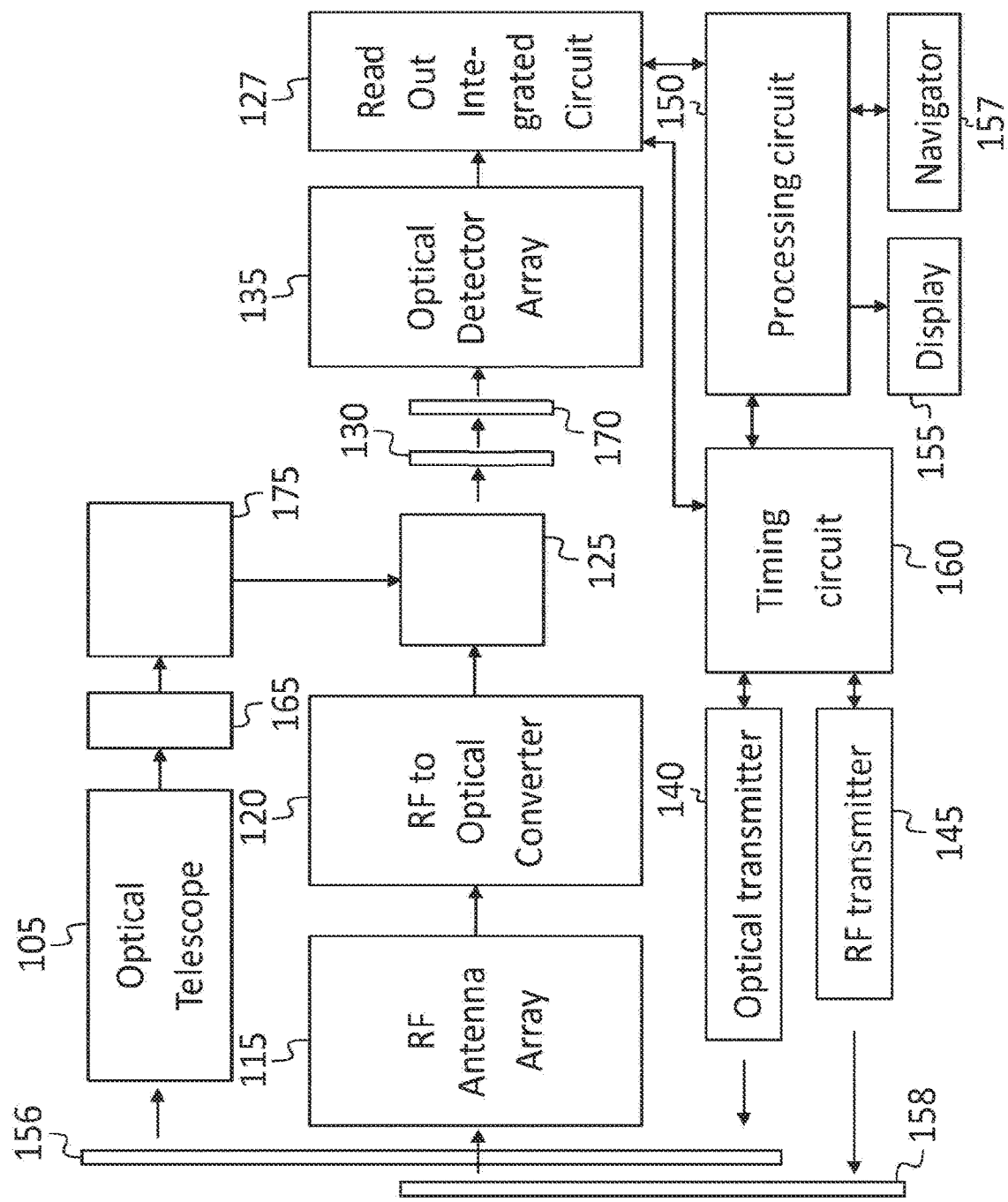
FIG. 1 is a block diagram of a sensing system, according to an embodiment of the present invention.

Referring to FIG. 1, in some embodiments, a sensing system includes an optical telescope 105, a radio frequency antenna array 115, a radio frequency to optical converter 120, an optical beam combiner 125, optical detector optics 130, an optical detector array 135, a read out integrated circuit 127, a processing circuit 150 and a display 155. In operation, the optical telescope 105 may receive light from an optical scene 156, this received light may be transmitted through the optical beam combiner 125 through the optical detector optics 130 (which may include a lens) and focused on the optical detector array 135. Each detector in the optical detector array 135 converts the received light into electric charge. The read out integrated circuit 127 measures the electric charge over a specified interval and outputs digital signals proportional to the charge. The processing circuit 150 converts this digital signal into the proper format to create an optical image of the scene on the display 155. The optical detector array 135 may periodically be reset and the time interval between any such reset, and a subsequent read-out of the cumulative photon detections since the reset may be referred to as a "frame".

In the embodiment of FIG. 1, the optical telescope 105 and the optical detector optics 130 may be considered to form an "optical receiver". As used herein, an "optical receiver" or a "radio frequency receiver" is a subsystem that receives and processes optical or radio frequency radiation propagating in free space. An "imaging receiver" (e.g., an imaging optical receiver or an imaging radio frequency receiver) is a subsystem that receives and processes the electromagnetic radiation in a manner making possible the reconstruction of an image of the scene. As such, the optical telescope 105 of FIG. 1 is an imaging optical receiver, and the combination of the optical telescope 105 and the optical detector optics 130 of FIG. 1 can also form an imaging optical receiver. Similarly, the radio frequency antenna array 115, the radio frequency to optical converter 120, and the optical detector optics 130 together form an imaging radio frequency receiver. In the embodiment of FIG. 1, the optical detector optics 130 form a shared element of (i) the imaging optical receiver that includes the optical telescope 105 and the optical detector optics 130 and of (ii) the imaging radio frequency receiver that includes the radio frequency receiver 115, the radio frequency to optical converter 120 and the optical detector optics 130. Similarly, in the embodiment of FIG. 1, the optical beam combiner 125 is a shared element of (i) the imaging optical receiver that includes the optical telescope 105 and the optical beam combiner 125 and of (ii) the imaging radio frequency receiver that includes the radio frequency antenna array 115, the radio frequency to optical converter 120 and the optical beam combiner 125. As used herein, an "optical beam combiner" is any passive optical system that has at least two inputs and at least one output, the light at the output being a linear combination of the light at the inputs. It may be a partially silvered mirror, for example, or it may include powered elements such as lenses. In some embodiments, it may include, for example, a grating or prism to combine different wavelengths.

The "optical scene", as used herein, means the set of things (e.g., buildings, vegetation, soil, rocks, vehicles, aircraft, sky, or clouds) from which light, in a wavelength range of interest, reaches the detector through the optical receiver. Similarly, the "radio frequency scene", as used herein, means the set of things from which electromagnetic radiation, in a frequency range of interest, reaches the detector through the radio frequency receiver, as discussed in further detail below.

Figure 2:
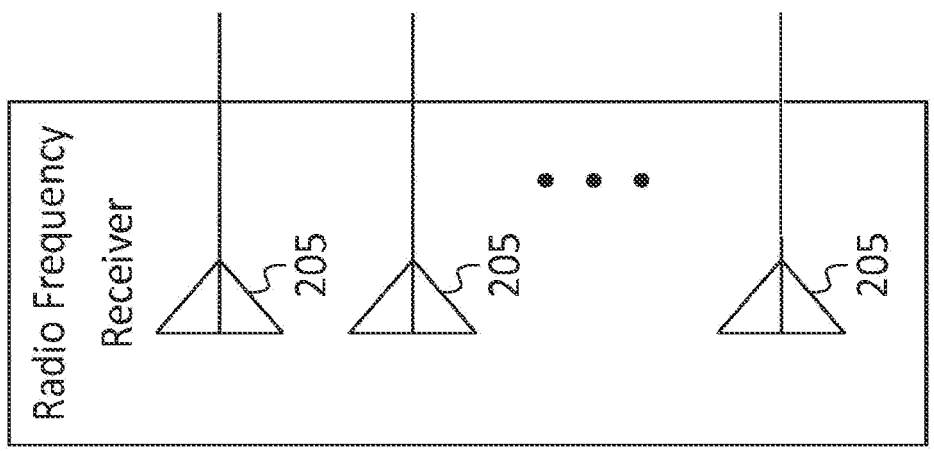
FIG. 2 is a block diagram of a radio frequency receiver, according to an embodiment of the present invention.
Figure 3:
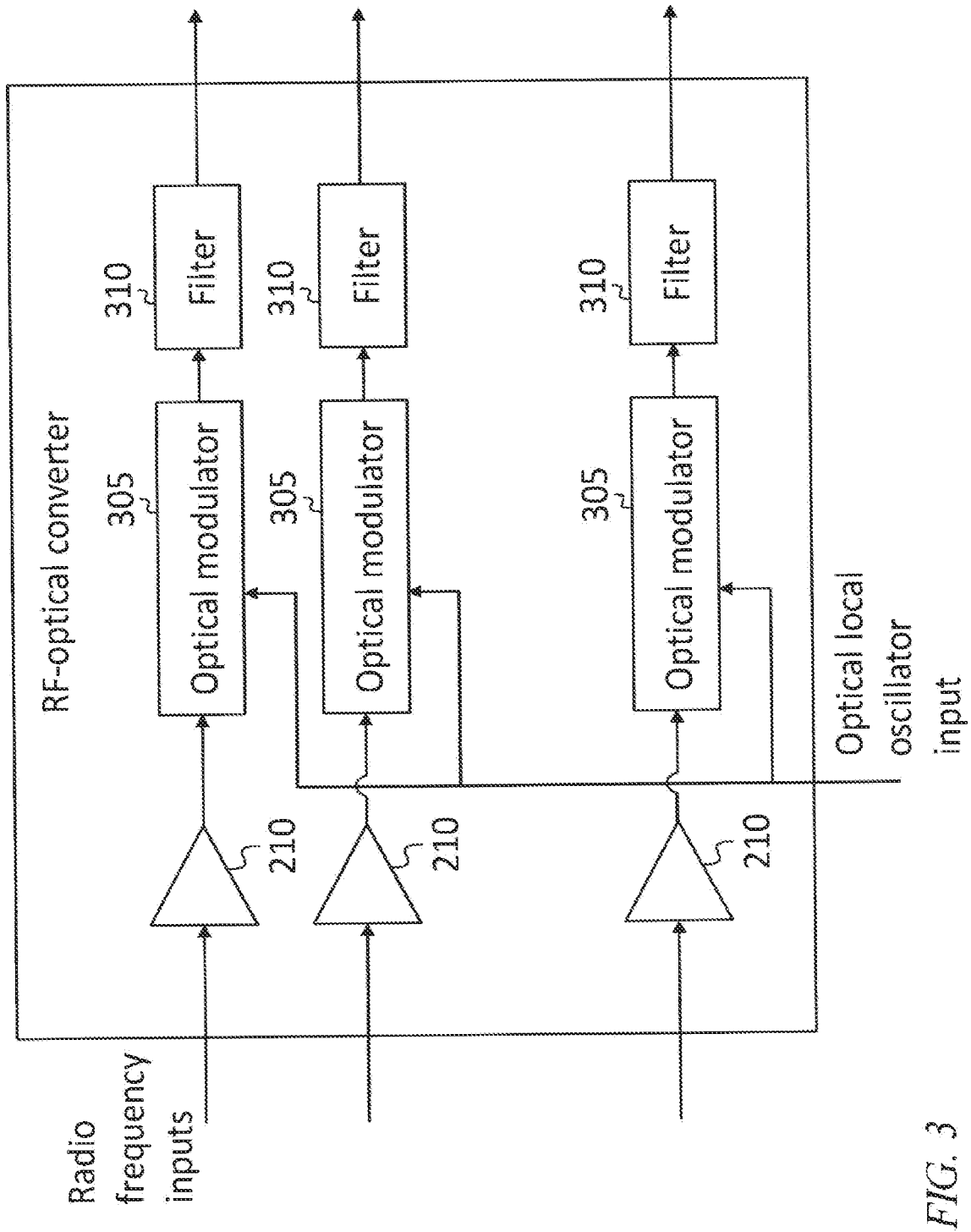
FIG. 3 is a block diagram of a radio frequency to optical converter, according to an embodiment of the present invention.

In the embodiment of FIG. 1, the radio frequency antenna array 115 may include a plurality of antenna elements 205 as illustrated in FIG. 2. Referring to FIG. 3, in some embodiments, the radio frequency to optical converter 120 includes a corresponding plurality of low noise amplifiers 210 and an array of optical modulators 305. Each optical modulator 305 has an optical local oscillator input fed by an optical local oscillator signal (e.g., a signal from an optical local oscillator 415, discussed in further detail below), a modulation input, and an output. In some embodiments, each optical modulator 305 is a phase modulator, which may include a nonlinear crystal (e.g., a lithium niobate crystal) the index of refraction of which depends on an electric field applied across it. In operation, a radio frequency tone received by one of the antenna elements 205, amplified by one of the low noise amplifiers 210 and input to one of the optical modulators 305 may cause phase modulation of the optical local oscillator signal, resulting, at the output of the optical modulator 305, in a signal including a carrier component, an upper sideband, and a lower sideband. For large modulation depth, other sidebands may also be present, and the carrier may be suppressed (or entirely absent, if the modulation depth corresponds to a zero of the zeroth Bessel function of the first kind).

Figure 4:
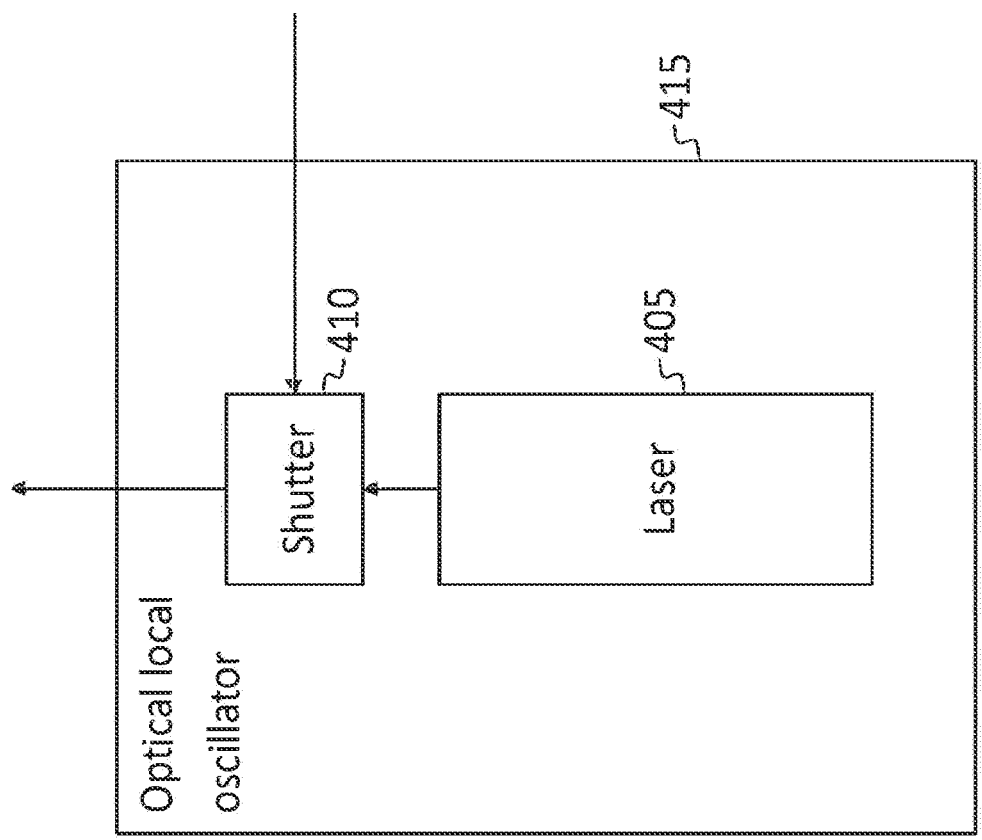
FIG. 4 is a block diagram of an optical local oscillator, according to an embodiment of the present invention.

The phase of the upper sideband may be equal to the sum of the phase of the optical local oscillator signal and the phase of the radio frequency tone. The output of each phase modulator may be connected to a filter 310 (e.g., a high-pass or bandpass filter) that allows the upper modulation sideband to pass and rejects or blocks the carrier and the lower modulation sideband. As such, each of the modulators in such an embodiment acts as a phase-preserving frequency converter. An amplitude modulator (e.g., an electro-absorption modulator or a Mach-Zehnder interferometer having a phase modulator in each arm, the phase modulators being driven in opposite directions by the radio frequency modulating signal), similarly followed by a filter 310 that passes one modulation sideband while blocking the carrier and the other modulation sideband, may similarly act as a phase-preserving frequency converter. Referring to FIG. 4, the optical local oscillator 415 may include, for example, a laser 405 (e.g., a fiber-coupled laser) and a shutter mechanism 410 (which may be used for image separation, as discussed in further detail below). In some embodiments, the optical local oscillator 415 has a coherence length comparable to or greater than a maximum round-trip time of flight for radio frequency signals, and coherent active radio frequency sensing may be performed by the sensing system.

Referring again to FIG. 1, the phase-preserving property of the phase-preserving frequency converters may make it possible to form, on the optical detector array 135, an optical image of the radio frequency scene 158. For example, near-planar radio frequency waves received by the radio frequency antenna array 115 from a distant radio frequency point source may have a phase that varies nearly linearly across the antenna elements of the array antenna, with a phase slope across the array antenna corresponding to the direction from which the waves arrive. This phase slope may be preserved at the outputs of the radio frequency to optical converter 120, causing the optical detector optics 130 to focus the optical signal at the output of the radio frequency to optical converter 120 to a single detector in the optical detector array 135, the location of the point corresponding to the direction from which the radio frequency waves arrive at the radio frequency antenna array 115.

The optical beam combiner 125 (and other optical beam combiners described herein) may be an optical element (e.g., a flat transparent plate (composed of, e.g., fused silica, or, for long-wave infrared signals, sodium chloride, potassium bromide, or another suitable material)) having a partially reflective coating on one surface, and configured to combine two optical beams propagating in free space. Such an element may also be known as a "beam combiner". In some embodiments the physical location of the optical channel and the radio frequency channel relative to the optical beam combiner may be interchanged with respect to the optical beam combiner 125, compared to the configuration of FIG. 1, so that the signal from the optical channel is transmitted through the optical beam combiner 125 and the signal from the radio frequency channel is reflected from the optical beam combiner 125. As used herein, the "optical channel" is the signal path from the input to optical telescope 105 and through the optical beam combiner 125 and the "radio frequency channel" is the signal path from the radio frequency antenna array 115 and through the optical beam combiner 125.

In some embodiments, the sensing system includes an optical transmitter 140 (e.g., an infrared (IR) transmitter) to illuminate the optical scene 156, or a radio frequency transmitter 145 (e.g., an X-band, 10 GHz transmitter radio frequency transmitter) to illuminate the radio frequency scene 158, or both. Such a configuration may enable "active" sensing to be performed, instead of, or in addition to, the "passive" sensing that may be performed when the sensing system lacks a transmitter (e.g., an optical transmitter 140 or a radio frequency transmitter 145). In such embodiments, the free space electromagnetic radiation received by the optical telescope 105 may be a combination of (i) "natural" electromagnetic radiation from the optical scene 156 (i.e., electromagnetic radiation that does not originate from within the sensing system, including, for example, electromagnetic radiation generated by objects in the optical scene (e.g., as thermal radiation, or by other radiation-generating processes) and electromagnetic radiation generated elsewhere (e.g., sunlight, or cosmic microwave background radiation) and reflected from the optical scene 156 and (ii) electromagnetic radiation emitted by the optical transmitter 140 and reflected from the optical scene 156. Similarly, the free space electromagnetic radiation received by the radio frequency antenna array 115 may be a combination of (i) natural electromagnetic radiation from the radio frequency scene 158 and electromagnetic radiation generated elsewhere and reflected from the radio frequency scene 158, and (ii) electromagnetic radiation emitted by the radio frequency transmitter 145 and reflected from the radio frequency scene 158. In active sensing modes the transmitted radiation may be used either for ranging (as discussed in further detail below) or to provide illumination (and thereby to increase the radiation received from the scene by the sensor) or both.

The optical detector array 135 array may be connected to a read out integrated circuit 127 and a processing circuit 150 which may in turn be connected to a display 155, or to a navigator 157, or to both. The display 155 may be for human-in-the-loop operation, and the navigator 157 may be for autonomous operation. The processing circuit 150 may receive data from the detectors in the optical detector array 135 from the read out integrated circuit 127 and cause the display 155 to display images of the optical scene 156 or the radio frequency scene 158. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single circuit wiring board (PCB) or distributed over several interconnected PCBs. A processing circuit may contain other processing circuits; for example a processing circuit may include two processing circuits, an FPGA and a CPU, interconnected on a PCB.

In some embodiments, the optical detector array 135 may simultaneously receive (i) signals corresponding to natural electromagnetic radiation from the optical scene 156 and electromagnetic radiation emitted by the optical transmitter 140 and reflected from the optical scene 156 and (ii) signals corresponding to natural radio frequency emission from the radio frequency scene 158 and electromagnetic radiation emitted by the radio frequency transmitter 145 and reflected from the radio frequency scene 158, and the displayed image may be a superposition of an image of the optical scene 156 and an image of the radio frequency scene, so that any object that is bright either at optical wavelengths or at radio frequencies will be bright in the displayed image.

In other embodiments, an image separation circuit may be employed to separate images corresponding to different signals received by the sensing system. For example, in a passive sensing embodiment (in which the optical transmitter 140 and the radio frequency transmitter 145 are absent or shut off), the image separation circuit may separate the signal generated by the optical detector array 135 into signals from the radio frequency channel corresponding to natural electromagnetic radiation from the radio frequency scene 158 and signals from the optical channel corresponding to natural electromagnetic radiation from the optical scene 156, and display them (or portions of them) separately on the display 155. Such separation may be accomplished by any of several methods.

For example, the wavelength bands of the optical signals received at the optical detector array 135 (i) from the optical channel and (ii) from the radio frequency channel may differ. In this case wavelength-dependent detection may be used to perform image separation. For example, a controllable optical detector filter 170 (e.g., a filter wheel with two bandpass filters, each corresponding to one of the two wavelength bands) may be employed between the optical detector optics 130 and the optical detector array 135 to allow only one of the two signals to reach the detector at any time. Alternatively, the optical path from the optical telescope 105 may include an optical filter 165 to block light in the wavelength band corresponding to the radio frequency channel to radio frequency to optical converter 120 from reaching the optical detector array 135. In operation, the processing circuit 150 may acquire, from the optical detector array 135, a first image during a first time interval, when a first filter (of the two filters) is in the optical path, and a second image during a second time interval, when a second filter (of the two filters) is in the optical path, and the processing circuit 150 (which may be, or which may include, the image separation circuit) may separate the images and cause the display 155 to display one or the other of the two images (e.g., as selected by a user) or to display the two images side by side or one above the other.

In a related embodiment, the optical detector array 135 may itself be wavelength selective, having for example an array of dual-band pixels, each of which is sensitive in a first wavelength range (e.g., short wavelength infrared (SWIR), e.g., 1.2 microns-3.0 microns) and in a second wavelength range (e.g., long wavelength infrared (LWIR), e.g., 8 microns-15 microns), for a first bias condition and for a second bias condition, respectively. The detector may be operated in the first bias condition (with a first bias voltage or a first bias current applied to each of the pixels) during a first time interval and in the second bias condition (with a second bias voltage or a second bias current applied to each of the pixels) during a second time interval, and the processing circuit 150 may then separate the images and, for example, display the corresponding images separately on the display 155 (e.g., displaying one or the other of the two images (e.g., as selected by a user) or displaying the two images side by side or one above the other).

In some embodiments, the wavelength band of the output of the radio frequency to optical converter 120 may be selectable. This may be accomplished by using a wavelength-selectable optical local oscillator 415 in combination with an optical detector array 135 that is wavelength selective. Such a wavelength-selectable optical local oscillator 415 may include two lasers, configured to operate at different wavelengths, and a system for switching between them. For example, the outputs of the two lasers may be connected to respective inputs of an optical power combiner, and the lasers may be configured so that only one operates at a time (and the other is shut off). In such an embodiment, the optical filter 165 may be absent. The controllable optical detector filter 170 may be a filter wheel with two bandpass filters, each corresponding to one of the two wavelengths of operation of the optical local oscillator 415. If the signal from the radio frequency channel is much stronger that the signal from the optical channel (e.g. as a result of close approach to a very high power radio frequency source), the sensing system may switch the controllable optical detector filter 170 to another wavelength band, switch the optical local oscillator 415 to fall within the newly selected wavelength band and switch the optical detector array 135 to the newly selected wavelength band. Operating in 2 different wavelength bands prevents saturation of the detector by the radio frequency channel.

The optical beam combiner 125 may have a wavelength-dependent transmissivity from the first input (the input corresponding to the radio frequency channel) to the output, the transmissivity being greater than 50% for the wavelength range of light from the radio frequency channel and less than 50% for the wavelength range of light from the optical channel. In some embodiments, the transmissivity from the first input to the output is greater than 75% for a first wavelength, within the wavelength range of the radio frequency channel, and the transmissivity from the first input to the output is less than 25% for a second wavelength, within the wavelength range of the optical channel.

In some embodiments, the optical local oscillator 415 may be controllable (e.g., by the processing circuit 150) to be enabled or disabled. For example, the optical local oscillator 415 may include a shutter mechanism 410 (FIG. 4) (e.g., an acousto-optic shutter, or a mechanical shutter) that is controllable to shut off the optical local oscillator 415, or the pumping of the laser may be shut off (e.g., in a semiconductor laser, the drive current may be shut off) to shut off the optical local oscillator 415. The optical path from the optical telescope 105 to the optical beam combiner 125 may also include an optical controllable element 175 for preventing light from propagating to the optical detector array 135; the optical controllable element 175 may be a mechanical shutter, for example, or a rotatable mirror. The optical controllable element 175 may be controllable, in a first state, to open the shutter, or steer received light to the optical detector array 135, and, in a second state, to close the shutter, or steer received light away from the optical detector array 135 (and, e.g., onto a beam dump). In such an embodiment, the sensing system may be operated, during a first time interval, with the optical controllable element 175 in the first state and the optical local oscillator 415 disabled, and, during a second time interval, with the optical controllable element 175 in the second state and the optical local oscillator 415 enabled. The processing circuit 150 may then separate the corresponding images and display the images separately on the display 155 (e.g., displaying one or the other of the two images (e.g., as selected by a user) or displaying the two images side by side or one above the other).

Figure 5:
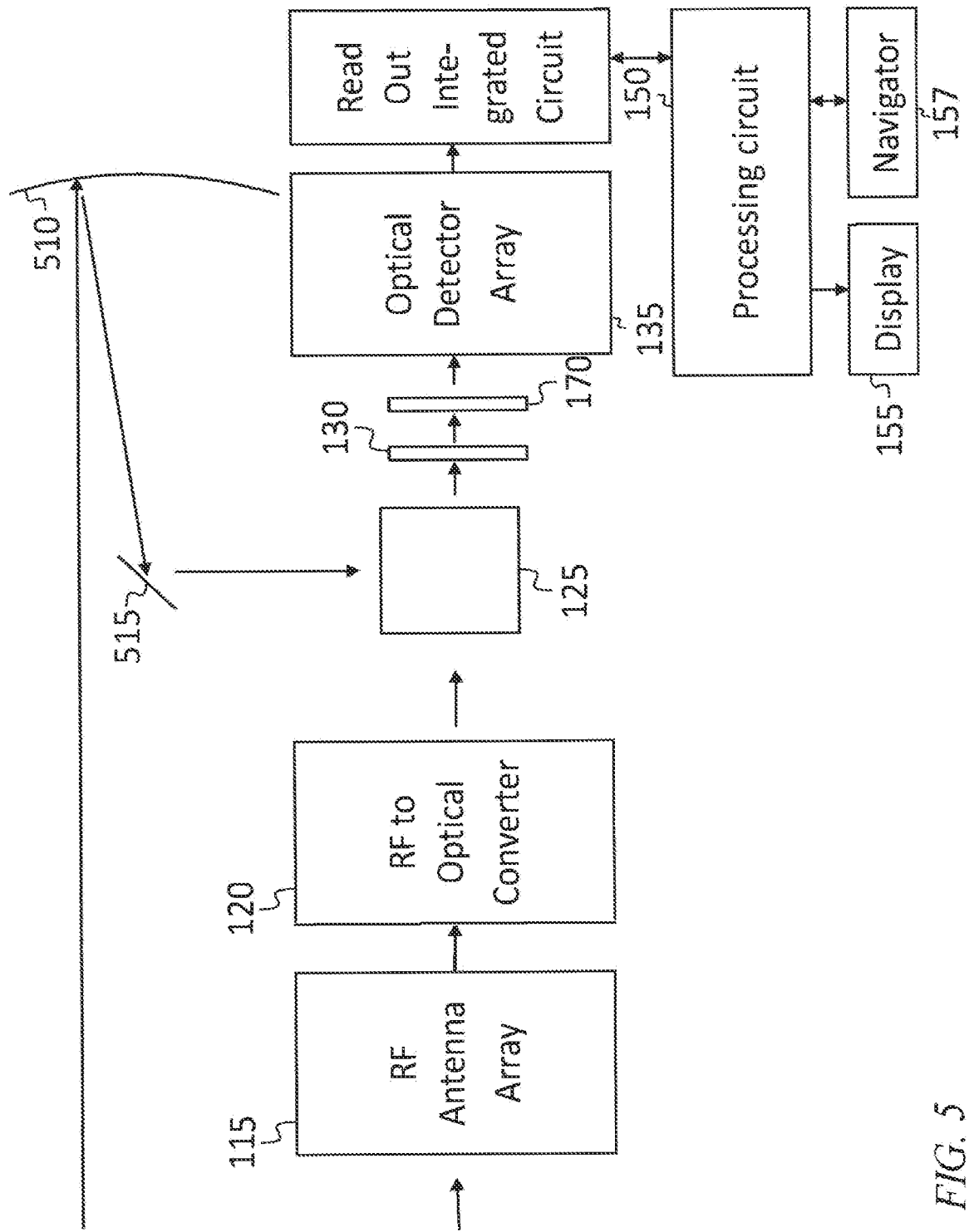
FIG. 5 is a block diagram of a sensing system, according to an embodiment of the present invention.

In some embodiments the optical telescope (105 in FIG. 1) may be, for example, a telescope with reflecting primary mirror 510 and reflecting secondary mirror 515, as shown in FIG. 5. In some embodiments, the phase delay through the channels of the radio frequency antenna array 115 and the radio frequency to optical converter 120 may not all be the same, and, for example, the effect of the variation in phase delay may be to convert received plane waves to converging spherical waves at the output of the radio frequency to optical converter 120, so that the optical detector optics 130 may be unnecessary, or so that (i) the optical detector optics 130 may be selected for compatibility with the optical telescope 105, and (ii) light corresponding to a distant radio frequency source may also be focused at the optical detector array 135.

In an embodiment with active sensing (i.e., with an optical transmitter 140 or a radio frequency transmitter 145, or both), time division multiplexing may be employed to separate the active images from each other and from the passive images. For example, the minimum round-trip time of flight for a radio frequency signal may be the round-trip time of flight for the nearest object in the radio frequency scene 158, and the maximum round-trip time of flight for a radio frequency signal may be the round-trip time of flight for the most distant object in the radio frequency scene 158. As such, if the "radio frequency reflection time interval" is the time interval that (i) begins later than the emission of a radio frequency pulse by the minimum round-trip time of flight and (ii) ends later than the emission of the pulse by the maximum round-trip time of flight, then the reflection from the radio frequency scene 158 of the radio frequency pulse may be received by the sensing system entirely within the radio frequency reflection time interval, and the reflection of the radio frequency pulse may be absent during a time interval preceding the radio frequency reflection time interval and during a time interval following the radio frequency reflection time interval. Similarly, the reflection of an optical pulse may be absent during a time interval preceding an analogous optical reflection time interval and during a time interval following the optical reflection time interval.

Separation of the active images from each other may then be performed by transmitting each radio frequency pulse and each optical pulse at respective times such that the radio frequency reflection time interval and the optical reflection time interval do not overlap; active images acquired by the optical detector array 135 during the radio frequency reflection time interval may then be free of influence from transmitted optical pulses, and may be displayed or used to perform radio frequency ranging (by measuring the time of flight). The active images may include, in addition to signals from the reflection of the radio frequency pulse, signals corresponding to natural radio frequency and optical (passive) emissions. These contributions may be sufficiently small to be neglected, or their effects may be reduced by blocking or disabling any input path not needed for the active image being acquired (e.g., putting the optical control element 175 in the second state when an active radio frequency image is acquired), or corrections may be made for their effects, for example, by subtracting from each active image acquired by the optical detector array 135 during the radio frequency reflection time interval a passive image obtained in otherwise similar circumstances (e.g., with the optical control element 175 in the second state) during a time interval when reflections from transmitted pulses are absent (i.e., outside of the radio frequency reflection time interval).

Active images acquired by the optical detector array 135 during the optical frequency reflection time may similarly be displayed or used to perform optical ranging. Ranging (either radio frequency ranging or optical ranging) may be performed with a ranging circuit. The ranging circuit may include a timing circuit 160 for controlling the timing of pulses transmitted by the optical transmitter 140 and the radio frequency transmitter 145, and for controlling the optical detector array 135 and read out integrated circuit 127 to perform accurate time of flight measurements. For example, the timing circuit 160 may send a first control signal to the optical transmitter 140, to cause it to transmit an optical pulse. After the minimum round-trip time of flight for an optical signal has elapsed, the timing circuit 160 may send a second control signal to the processing circuit 150 and the read out integrated circuit 127, to begin recording arrival times of photons, and after the maximum round-trip time of flight for an optical signal has elapsed, the timing circuit 160 may send a third control signal to the processing circuit 150 and the read out integrated circuit 127, to stop recording arrival times of photons. The time interval between the first control signal and the photon arrival times may be divided by 2 times the speed of light by the ranging circuit, to calculate the range to the optical scene, for each detector in the optical detector array 135.

If the total number of received photons is relatively small, then the range estimation error for any pixel may be unacceptably large. In this case the arrival times from all of the detectors may be aggregated, and used to calculate a single (average) range for the entire optical scene. The ranging circuit may include the timing circuit 160, arrival-time estimating circuits within the processing circuit 150 and some or all of the circuitry in the read out integrated circuit 127, which may be used to perform corrections for passive background, perform range calculations, format the resulting range data for display, and the like. In such an embodiment the "image" generated by the ranging circuit may be a single estimated range. In other embodiments the active image generated by the sensing system may include range as a function of position on the optical detector array 135, or reflectivity as a function of position on the optical detector array 135, or both.

The output of the read out integrated circuit 127 is referred to herein as an "image" or a sequence of "images" regardless of the representation of this output. The output may be, for example, a two dimensional array representing the electromagnetic radiation detected by the array of detectors of the optical detector array 135, or it may be a two dimensional array, each element of which is the time of arrival of a photon detected, during an exposure, in the array of detectors in the optical detector array 135 or it may be an average of the arrival times detected by all of the detectors in the optical detector array during a frame. As such, in the context of the image separation circuit, an image may be a single range value.

Different images (e.g., active or passive optical images and active or passive radio frequency images) may be displayed on the display 155 in various ways. In some embodiments, as mentioned above, user input may be used to select one such image at a time for display. In other embodiments, the display 155 may display several images, or portions of images, simultaneously. For example, the display 155 may display the current (i.e., most recently obtained) passive optical image in its upper left quadrant, the current passive radio frequency image in its upper right quadrant, the current active optical image in its lower left quadrant, and the current active radio frequency image in its lower right quadrant. In other embodiments, if certain portions of the radio frequency scene or of the optical scene are of particular interest, the display 155 may display the interesting portions on different parts of the display screen. For example, if a portion of the optical scene is obscured by cloud or fog, then a portion of the radio frequency scene corresponding to that portion of the optical scene may be displayed, in a portion of the display 155 that otherwise might show the obscured portion of the optical scene, were it not obscured. In some embodiments, images may be overlaid; for example, a passive optical image and a passive radio frequency image may be overlaid by summing the respective pixel values, or text indicating a range value (obtained from an active optical image or an active radio frequency image) may be overlaid on another image (e.g. on a passive optical image or on a passive radio frequency image).

Figure 6:
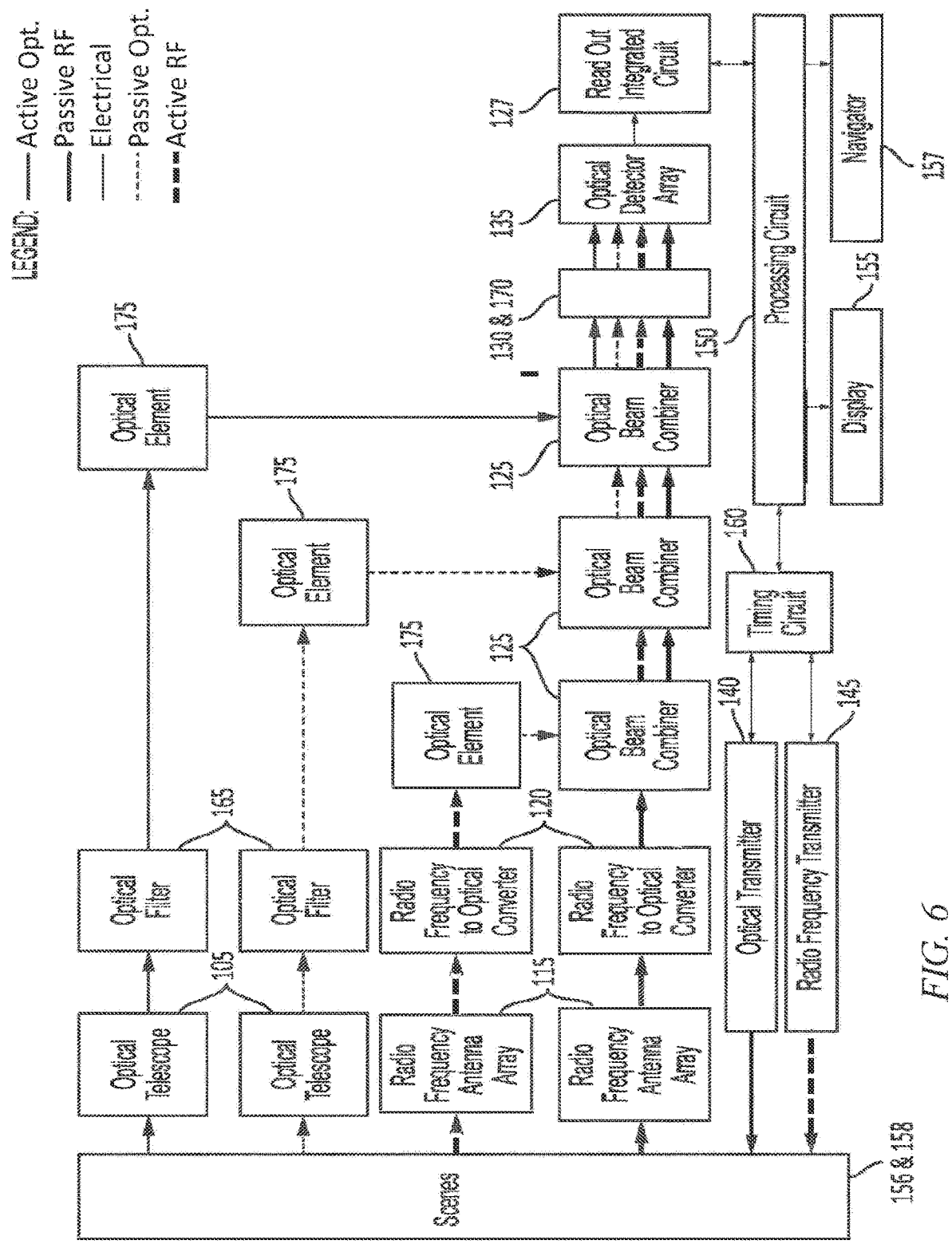
FIG. 6 is a block diagram of a sensing system, according to an embodiment of the present invention.

FIG. 6 is a block diagram of a sensing system for use in a degraded visual environment, in some embodiments. The elements shown in FIG. 6 have functions that are analogous to elements with the same reference symbols in FIG. 1. The embodiment of FIG. 6 includes the first radio frequency antenna array 115 for passive sensing (the lower radio frequency array 115 of FIG. 6.) and the second radio frequency antenna array 115 for active sensing (the upper radio frequency antenna array 115 of FIG. 6) from the first and second radio frequency scenes, respectively, first and second radio frequency to optical converters 120, connected to the first and second radio frequency antenna arrays 115, and the first optical telescope 105 configured to collect passive long-wave infrared or mid-wave infrared or short-wave infrared or visible or ultraviolet radiation for passive optical sensing (the lower optical telescope 105 of FIG. 6) and the second optical telescope configured to collect short-wave infrared radiation for active optical sensing (the upper optical telescope 105 of FIG. 6) from first and second optical scenes, respectively, first and second optical filters 165 (e.g., bandpass filters for the long-wave infrared, mid-wave infrared, short wave infrared or visible or ultraviolet radiation and short-wave infrared radiation), connected to the first and second optical telescopes 105, respectively, first, second, and third optical controllable elements 175 (connected to the second radio frequency to optical converter 120, the first optical filter 165 and the second optical filter 165, respectively, first, second, and third optical beam combiners 125 (connected to the first, second, and third optical controllable elements 175, respectively), optical detector optics 130 and a controllable optical detector filter 170 (shown combined in a single block in FIG. 6), an optical detector array 135, a read out integrated circuit 127, a processing circuit 150, a navigator 157, a display 155, a timing circuit 160, an optical transmitter 140 and a radio frequency transmitter 145. Such a sensing system may be employed, for example, in a degraded visual environment, which may exist, for example, when a helicopter, at takeoff or landing, stirs up a cloud of dust that obscures the view of the pilot (and of any electronic optical sensors for sensing visible light).

In the embodiment of FIG. 6, the second radio frequency receiver 115, and the second radio frequency to optical converter 120 together form, on the optical detector array 135, an optical image of a radio frequency scene within a field of view of the imaging radio frequency receiver that includes the second radio frequency receiver 115 and the second radio frequency to optical converter 120. The first optical telescope 105 forms, on the optical detector array 135, an optical image of an optical scene within a field of view of the first optical telescope 105. The second optical telescope 105 forms, on the optical detector array 135, an optical image of an optical scene within a field of view of the second optical telescope 105. In some embodiments the three optical beam combiners 125 are replaced with a single element, such as a suitable grating, for combining the four beams into one beam that is then sent to the optical detector array 135.

In the embodiment of FIG. 6, the optical detector array 135 may be sensitive in two wavelength ranges, e.g., LWIR and SWIR. The active radio frequency and active optical signals may be separated by time division multiplexing, as described above, for example. The LWIR channel may receive radiation that propagates relatively well through dust-filled air; as such, the LWIR image generated by the system of FIG. 6 may remain available even in a degraded visual environment.

Although limited embodiments of a sensor for a degraded visual environment have been specifically described and illustrated herein, many modifications and variations will be apparent to those skilled in the art. Accordingly, it is to be understood that a sensor for a degraded visual environment employed according to principles of this invention may be embodied other than as specifically described herein. The invention is also defined in the following claims, and equivalents thereof.

What is claimed is:

1. A sensing system, comprising:
a radio frequency (RF) antenna array for receiving an RF signal of a scene originated from a radio frequency (RF) transmitter;
an RF to optical converter for converting the received RF signal to a first optical signal;
an optical receiver for receiving an optical signal of the scene generated by an optical transmitter, and producing a focused optical signal, wherein the focused optical signal includes an active optical signal and a passive optical signal, wherein the active optical signal is received by the optical receiver when the optical transmitter illuminates the scene, and wherein the passive optical signal includes electromagnetic radiation received by the optical receiver not originated from within the sensing system;
an optical beam combiner optically coupled to the RF to optical converter and to the optical receiver for optically combining the first optical signal and the focused optical signal to produce a combined optical signal having different wavelength ranges;
an optical detector array optically coupled to the optical beam combiner that detects the first optical signal with a first wavelength range and detects the focused optical signal in a second different wavelength range for sensing the combined optical signal for said different wavelength ranges and converting the sensed combined optical signal to electrical charge;
a read out integrated circuit electrically coupled to the optical detector for measuring the electrical charge and outputting a first digital signal corresponding to the first wavelength range for an image from the RF transmitter and a second digital signal corresponding to the second wavelength range different from the first wavelength range for an image from the optical transmitter proportional to the measured charge; and
a processing circuit electrically coupled to the read out integrated circuit capable of separating the images and displaying only the image from the RF transmitter, only the image from the optical transmitter, and both images from the RF transmitter and the optical transmitter, on a display, wherein outputs of the RF transmitter and the optical transmitter are time multiplexed such that time intervals of the RF signal from the scene and the focused optical signal from the scene do not overlap.

2. The sensing system of claim 1, further comprising an optical oscillator Including a laser, and a shutter for image separation.

3. The sensing system of claim 1, further comprising an image separation circuit configured to generate a first image from a first portion of the signal from the optical detector array, the first portion corresponding to a sub-interval of a first time interval in which the reflection, from the scene of the optical signal is absent, and a second image from a second portion of the optical signal from the optical detector array, the second portion corresponding to a sub-interval of a time interval in which the reflection from the scene of the radio frequency pulse is absent.

4. The sensing system of claim 1, wherein the processing circuit is configured to:
receive user input to select from among the first image, the second image, a third image and a fourth image, and to cause the display to display the selected image.

5. The sensing system of claim 4, wherein the processing circuit is further configured to concurrently display two of: the first image, the second image, the third image, and the fourth image.

* * * * *